United States Patent [19]

Kitchen

[11] 4,309,977
[45] Jan. 12, 1982

[54] PULSE COMBUSTION APPARATUS

[76] Inventor: John A. Kitchen, R.R. #3, Hastings, Ontario, Canada, K0L 1Y0

[21] Appl. No.: 148,624

[22] Filed: May 12, 1980

[51] Int. Cl.³ .......................... F24H 3/00; F23C 11/04
[52] U.S. Cl. ............................. 126/99 A; 126/116 A; 431/1; 431/18
[58] Field of Search ............... 126/116 R, 116 A, 112, 126/99 A, 109, 110 R; 431/1, 18, 19, 69, 71, 72, 73, 74

[56] References Cited

U.S. PATENT DOCUMENTS

| | | | |
|---|---|---|---|
| 2,708,926 | 5/1955 | Huber et al. | 126/91 R |
| 2,911,957 | 11/1959 | Kumm | 431/1 |
| 2,916,032 | 12/1959 | Kitchen | 126/116 R |
| 3,267,985 | 8/1966 | Kitchen | 431/1 |
| 3,447,878 | 6/1969 | Haag et al. | 431/1 |
| 3,683,887 | 8/1972 | Sammut | 126/116 A |
| 3,897,195 | 7/1975 | Finch | 431/19 |
| 4,080,149 | 3/1978 | Wolfe | 431/19 |
| 4,164,210 | 8/1979 | Hollowell | 126/116 R |
| 4,241,723 | 12/1980 | Kitchen | 431/1 |
| 4,260,361 | 4/1981 | Huber | 431/1 |

Primary Examiner—Daniel J. O'Connor
Attorney, Agent, or Firm—Rogers, Bereskin & Parr

[57] ABSTRACT

The disclosure relates to pulse combustion apparatus generally and to air furnaces of the pulse combustion type. In one aspect, the invention provides a furnace which includes a combustion chamber and an exhaust system disposed in a passageway for air to be heated. The exhaust system includes a primary exhaust pipe, a manifold to which the primary exhaust pipe is coupled, and a plurality of heat exchange pipes which extend from the manifold across the air passageway. The primary exhaust pipe, manifold and heat exchange pipes form a reasonant system with the combustion chamber so that the ignition of successive fuel charges in the chamber causes pressure waves to oscillate throughout said exhaust system including the heat exchange pipes for promoting transfer of heat from the pipes to air flowing through the passageway in use. According to another aspect of the invention there is provided a control system for a pulse combustion apparatus in which the air velocity in a combustion air intake is sensed and used for controlling the apparatus. The system responds to a first air intake velocity as indicating satisfactory operation of a starting blower and activates the gas supply and ignition means, and to a second air intake velocity as indicating establishment of combustion; the circuit will then de-activate the ignition means and blower. The system also includes a timer which will shut off the gas supply if the second velocity is not achieved after a predetermined time interval from initiation of a starting attempt.

12 Claims, 9 Drawing Figures

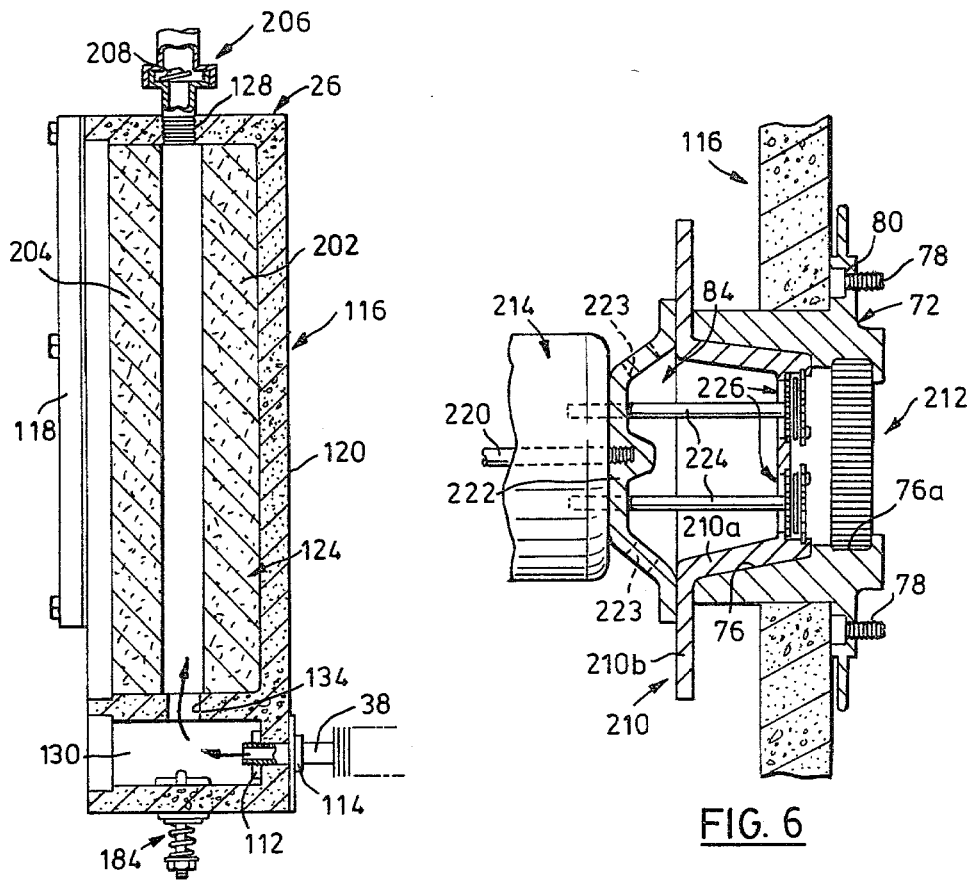
FIG. 5
FIG. 6
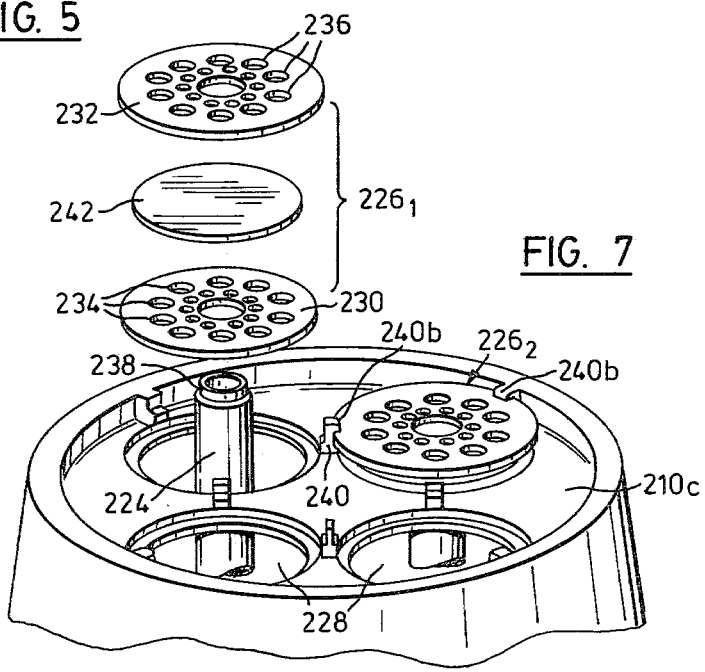
FIG. 7

PULSE COMBUSTION APPARATUS

This invention relates to pulse combustion apparatus generally, and to air heaters of the pulse combustion type; for convenience, such heaters will hereinafter be referred to as pulse combustion air furnaces.

U.S. patent literature contains numerous examples of prior art pulse combustion apparatus. Typically, such an apparatus includes a combustion chamber and an exhaust pipe which forms a resonant system with the combustion chamber. The apparatus operates on a cycle in which a fuel charge is admitted to the combustion chamber and ignited. The charge then expands into the exhaust pipe causing a partial vacuum transient in the combustion chamber, which both assists in drawing in a fresh fuel charge and causes high temperature gas to be drawn back into the combustion chamber from the exhaust pipe. The fresh fuel charge is ignited spontaneously from flame fronts in the returning high temperature gas, thereby establishing the next cycle. Accordingly, the apparatus is self-sustaining after initial ignition. In a pulse combustion heater, a fluid to be heated is brought into heat exchange relationship with the exhaust pipe.

By way of example, pulse combustion heaters are disclosed in my U.S. Pat. Nos. 3,267,985 and in U.S. Pat. 4,241,723; and U.S. Pat. 4,241,720. The various forms of apparatus disclosed are intended primarily (but not exlusively) for use as boilers, i.e. for heating water. However, it has been proposed to use this type of apparatus specifically for heating air. Examples of this type of apparatus are shown in my U.S. Pat. Nos. 2,916,032 and in U.S. Pat. Nos. 2,708,926 (Huber et al.) and 4,164,210 (Hollowell). In Hollowell, hot gases from a tubular combustion chamber are delivered through a tail pipe into an exhaust decoupling or expansion chamber which absorbs the pulsating pressure waves produced by the repeated explosions in the combustion chamber. The exhaust gases then flow under steady conditions through a secondary heat exchanger. Air to be heated is caused to flow over the exterior surfaces of the heat exchanger and combustion chamber.

An object of the present invention is to provide a pulse combustion air furnace in which the efficiency of heat transfer to the air to be heated is improved compared with the prior art. Other objects of the invention are to provide improvements in pulse combustion apparatus generally.

According to a first aspect of the invention there is provided a pulse combustion air furnace which includes means defining a passageway through which air to be heated can flow. A combustion chamber havig a fuel charge inlet and an exhaust gas outlet is supported in the combustion chamber in the air flow passageway. Associated with the combustion chamber inlet is means for admitting successive fuel charges to the chamber and the apparatus includes means operable to initiate combustion in the chamber. An exhaust system is disposed in the air passageway and includes a primary exhaust pipe having first and second ends and coupled at its first end to said exhaust gas outlet of the combustion chamber. The second end of the primary exhaust pipe is coupled to the inlet of a manifold which also has a plurality of outlets. The exhaust system further includes a plurality of heat exchange pipes each having an inlet coupled to one of the manifold outlets, and an outlet. The pipes extend from the manifold across the air passageway so that they are disposed in the path of air flowing through the passageway in use. The second ends of the heat exchange pipes are coupled to means defining a muffler chamber. The primary exhaust pipe, manifold and heat exchange pipes form a resonant system with the combustion chamber in which ignition of successive fuel charges in the combustion chamber causes pressure waves to oscillate throughout said exhaust system including the heat exchange pipes for promoting transfer of heat from the pipes to air flowing through said passageway in use.

The invention also provides a number of improvements in pulse combustion apparatus generally.

In order that the invention may be more clearly understood, reference will now be made to the accompanying drawings which illustrate a preferred embodiment of the invention by way of example, and in which:

FIG. 5 is a vertical sectional view on line V—V of FIG. 3, showing the chest as installed;

FIG. 6 is a detail view of part of FIG. 1;

FIG. 7 is an exploded perspective view of part of FIG. 6;

Figure 1:
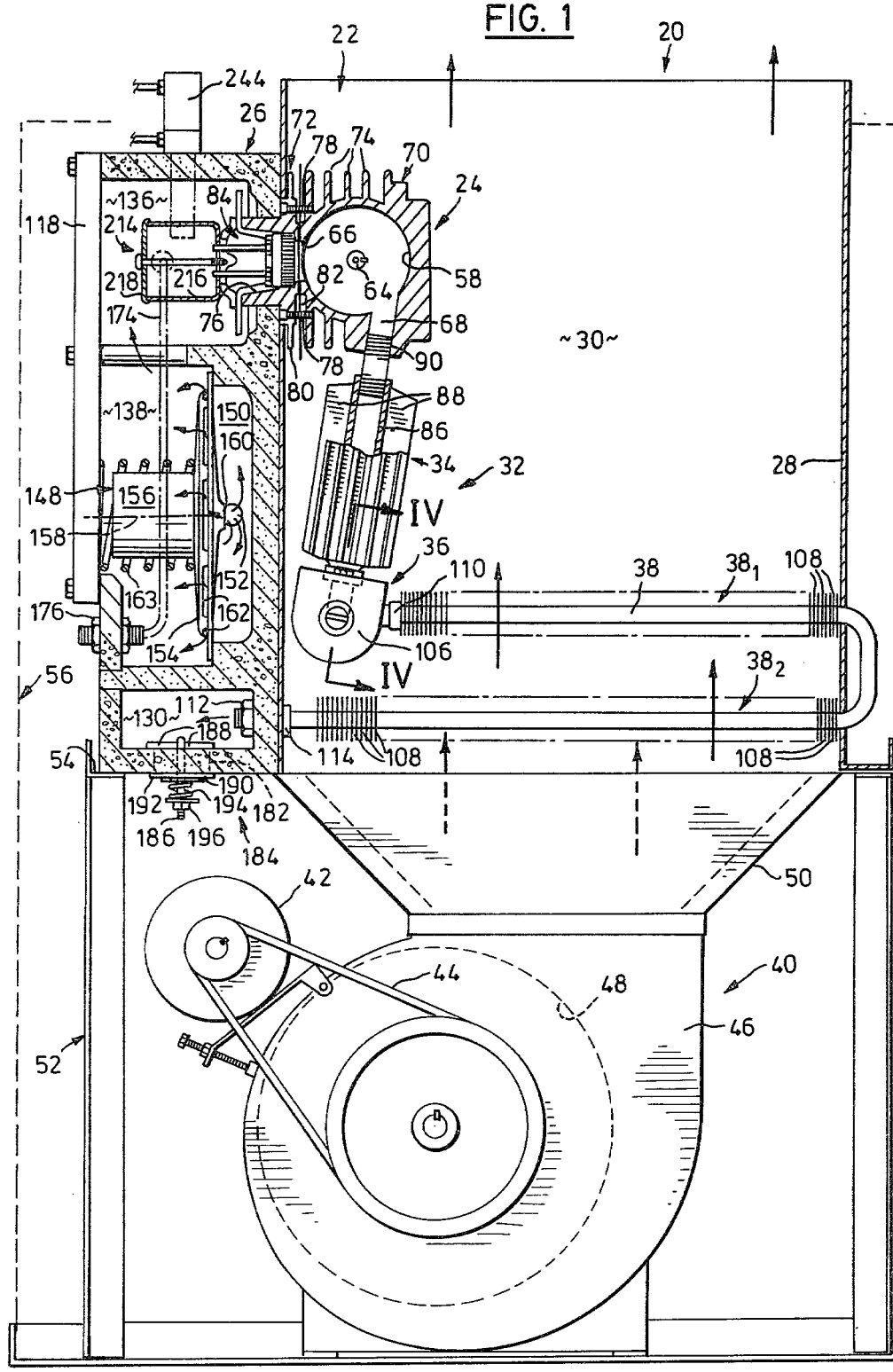
FIG. 1 is a vertical sectional view through an air furnace according to the invention.

Referring first to FIG. 1, the apparatus as a whole is generally designated 20 and includes a pulse combustion apparatus indicated at 22. A combustion chamber of the apparatus is indicated at 24 and is shown supported by a chest 26 in the form of a concrete casting. A sheet metal casing 28 which is of rectangular shape in cross-section and which has open upper and lower ends surrounds combustion chamber 24 and defines a vertical passageway 30 through which air to be heated can flow around chamber 24 generally in the direction of the arrows. Also disposed within air passageway 30 is an exhaust system 32 of the apparatus. The system includes a primary exhaust pipe or jet pipe 34, a manifold 36 and a plurality of heat exchange pipes 38. The pipes 38 are coupled to the manifold 36 at their inner ends and to chest 26 at their outer ends as will be more specifically described later.

In this particular embodiment, the furnace also includes a conventional squirrel-cage type blower indicated at 40 driven from an electric motor 42 by a belt 44. The blower includes a casing 46 having an inlet 48 which is at the front as seen in FIG. 1; the vanes of the blower have not been shown since the blower itself forms no part of the present invention. For present purposes, it is sufficient to note that the blower draws in air in the axial direction through opening 48 and delivers it tangentially in the upward direction indicated by the arrows in FIG. 1. Casing 46 has a divergent outlet section 50 which matches with the lower end of the casing 28 referred to above. Thus, the air passageway 30 defined by casing 28 in effect forms a plenum chamber receiving forced air from blower 40.

An angle-iron framework 52 is provided around blower 46 and forms a support for the pulse combustion apparatus and casing 28. Thus, the framework defines a rectangular recess 54 which opens upwardly and which receives chest 26 and casing 28 so that the pulse combustion apparatus itself "sits" on framework 52. Although the apparatus will be quite stable if it is not physically connected to framework 52, suitable retaining means such as screws (not shown) may be provided between the framework and casing 28 and/or chest 26. An outer casing or shell is indicated in outline 56 but has not been shown in detail since it is not significant to the invention. With shell 56 in place, the furnace as a whole will have an overall appearance resembling that of a conventional burner-type air furnace and will form a self-contained unit which can be coupled to ductwork as in a conventional forced air heating system.

Figure 2:
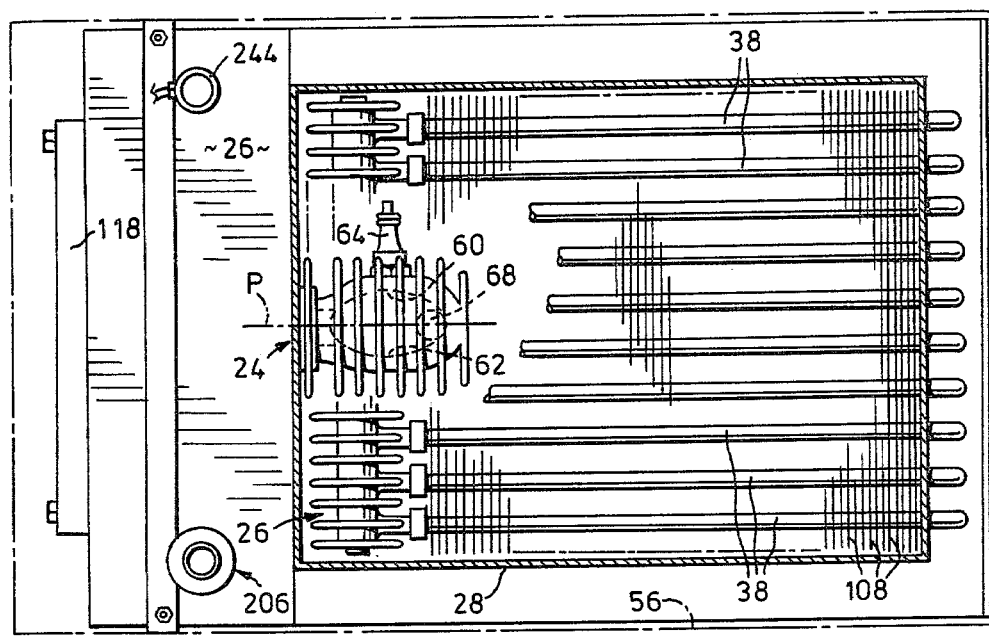
FIG. 2 is a plan view corresponding to FIG. 1.

Referring now to FIG. 1 in somewhat more detail, the combustion chamber 24 of the pulse combustion apparatus defines an internal combustion cavity 58 which is generally of flattened spherical shape (see the dotted line indicated at 58 in FIG. 2). Cavity 58 extends about a median plane which is indicated as P in FIG. 2 and in which the section of FIG. 1 is taken. The cavity is circular in plane P and curves inwardly from both sides of the plane around its entire periphery towards somewhat flattened ends 60 and 62 (see FIG. 2). A spark plug 64 is received in a screw-threaded opening disposed at end 60 of cavity 58. A high-tension electrical lead (not shown) is connected to the spark plug and the plug is used to initiate combustion in chamber 24 as will be described later. Once initiated, combustion is self-sustaining and spark plug 64 is not used.

Combustion chamber 24 has an inlet 66 (FIG. 1) through which successive fuel charges enter cavity 58, and an exhaust gas outlet 68. Inlet 66 and outlet 68 are both disposed in median plane P. Inlet 66 extends radially of cavity 58 and generally horizontally, while outlet 68 is tangential with respect to the cavity and extends downwardly. The outlet is in fact inclined slightly to the vertical so that the primary exhaust pipe 34 can be disposed in an inclined position as shown in which it is well clear of chest 26 for good cooling by the air flowing through passageway 30 but at the same time is positioned to allow a relatively compact overall exhaust system arrangement.

The shape of combustion chamber cavity 58 and its disposition in what might be termed "edge on" relationship to chest 26 are selected so that the combustion chamber is also well exposed to the air flowing in passageway 30 for good heat transfer to the air and cooling of its associated valves (see later).

In this particular embodiment, the combustion chamber is made of two iron castings denoted respectively 70 and 72 in FIG. 1. Casting 70, which might be referred to as the main casting, is formed internally with cavity 58 and externally with a plurality of heat-radiating fins 74 which encircle the casting and which are disposed generally parallel to the direction of air flow in passageway 30. Casting 72 defines an internal passageway 76 through which fuel charges flow to the combustion chamber inlet 66. The two castings are secured together by four equi-angularly spaced socket-headed bolts, two of which are visible at 78 in FIG. 1. The bolts extend outwardly through plain openings in a flange 80 of casting 72 (which in effect forms another heat radiating fin on the combustion chamber) and each bolt is received in a screw-threaded opening in casting 70. A thin aluminum plate 82 is trapped between the two castings with the interposition of asbestos gaskets (not shown) and forms a heat sink to inhibit heat transfer from casting 70 to casting 72. The combustion chamber is secured to chest 26 by four further bolts (not shown) which are disposed between the bolts 78 and which extend inwardly through the outer wall of chest 26 and which receives nuts inside the chest. Casing 28 is trapped between the combustion chamber and chest 26.

Associated with the combustion chamber inlet 66 are means generally indicated at 84 for admitting successive fuel charges to the chamber. These means include pressure-responsive valves which open to admit air and gas to the combustion chamber during each vacuum transient in cavity 58, and which close in response to increasing pressure in the chamber during each explosion therein. Details of the valve construction will be provided later with particular reference to FIG. 6 and 7 of the drawings. In the meantime, the exhaust system 32 will now be described in more detail primarily with reference to FIGS. 1, 2 and 4.

Figure 4:
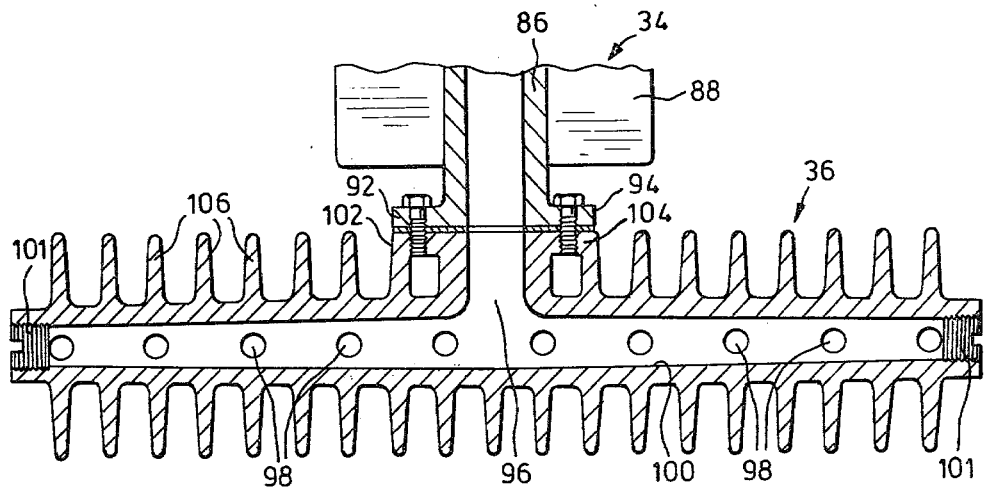
FIG. 4 is a detail sectional view on line IV—IV of FIG. 1.

The primary exhaust pipe 34 comprises a length of straight cast iron pipe 86 having integrally formed on its external surface, a plurality of radially projecting fins 88 which are spaced equi-angularly about pipe 86. In this particular embodiment, twelve such fins are employed and again serve to assist heat transfer to the air flowing through passageway 30. The upper end portion of pipe 86 is internally screw-threaded and receives an externally screw-threaded nipple 90 which is also engaged with corresponding internal screw threads in the exhaust outlet 68 from casting 70. At its lower end, two lugs or ears project radially from pipe 86 for the purpose of connecting the pipe to manifold 36 as best illustrated in FIG. 4. In that view, the two lugs on pipe 86 are indicated at 92 and 94. With continued reference to that view, it will be seen that manifold 36 is of elongate form and has a central inlet 96 to which the primary exhaust pipe 32 is coupled, and a plurality of outlets 98 which are spaced along the manifold and which communicate with inlet 96 by way of an internal passageway 100. Inlet 96 is defined by an annular formation on the manifold, which has a pair of laterally projecting ears or lugs 102 and 104 at its upper end which match the lugs 92 and 94 on the primary exhaust pipe. The exhaust pipe and manifold are secured together by bolts passing through openings in lugs 92 and 94 and received in screw-threaded openings in lugs 102 and 104.

Manifold 36 is an iron casting. As manufactured, internal passageway 100 is open at both ends and the end portions of the passageway are internally screw-threaded for receiving sealing plugs 101; alternatively, the plugs may be welded in place. Passageway 100 is of slightly smaller diameter adjacent the plugs than in the vicinity of inlet 96 and tapers outwardly from the inlet. This is done in order to provide a more constant velocity along the manifold and less turbulence than would otherwise occur. The sealing plugs at the ends of the manifold are disposed as close as possible to the endmost outlets so as to minimize the possibility of pressure waves being reflected from the plugs. This feature combined with the tapering of passageway 100 makes for a smoother and more constant gas flow through the manifold than would otherwise be achieved. Finally, it will be noted that the manifold is formed with a plurality of integrally cast heat-radiating fins 106, the elevational shape of which is best seen in FIG. 1.

Each of the manifold outlets 98 receives one of the heat exchange pipes 38 (FIG. 1). As can best be seen from that view, each pipe 38 extends from the manifold across the air passageway 30 and then curves downwardly and back across passageway 30 to chest 26. In other words, each pipe defines an upper run $38_1$ and a lower run $38_2$ through which exhaust gases flow successively. Both pipe runs are exposed to the air to be heated, so that the air will pass upwardly through what are in effect two "banks" of heat exchangers (defined by the lower and upper runs respectively of all of the pipes 38) in counter flow to the exhaust gases. In fact, the furnace is designed so that the air to be heated flows counter to the direction of exhaust gas flow over the whole length of the air passageway. This counter flow design ensures that maximum temperature differentials and hence maximum heat transfer rates are achieved between the air and gas over the whole length of the pulse combustion apparatus.

Heat radiating fins 108 are provided on both runs $38_1$ and $38_2$ of the heat exchange pipes 38. Each fin takes the form of a thin and narrow elongate plate which extends over all of the pipes in the relevant run and which is formed with openings through which the pipes extend. Each fin is in fact simply friction fitted to the associated pipe.

Between its two runs $38_1$ and $38_2$, each pipe passes through a wall of casing 28 for support as shown in FIG. 1. The pipe then returns along run $38_2$ and passes through the opposite wall of casing 28 and into chest 26.

The primary exhaust pipe 32, the manifold 36, and the heat exchange pipes 38 form a resonant system with the combustion chamber so that ignition of successive fuel charges in the chamber causes pressure waves to oscillate throughout the whole exhaust system including the heat exchange pipes. It has been found that the presence of these oscillating pressure waves in the heat exchange pipes causes a much higher rate of heat transfer to the air flowing through passageway 30 than would occur under steady flow conditions such as in an apparatus in which the heat exchanger is decoupled from the combustion chamber, for example in the manner disclosed in U.S. Pat. No. 4,164,210 discussed above. This is achieved by designing the manifold 36 so that its internal passageway (100) presents a minimum cross-sectional area to gases flowing therethrough, with the result that the manifold offers substantially no cushioning effect to the gas pressure waves. In other words, the pressure waves are transmitted to the heat exchange pipes rather than being absorbed as in the case in which a decoupling chamber is provided. In fact, practical tests have shown that the rate of heat transfer achieved with the invention can be such that the temperature of the exhaust gases leaving the heat exchange pipes 38 can be as low as 100° F. compared with temperatures of the order of 3000° F. at the combustion chamber outlet. Counter flow of the exhaust gases with respect to the air to be heated (as discussed above) is believed to be a significant factor contributing to this high efficiency.

In a particular embodiment of the invention, the total length of the gas flow path from the combustion chamber exhaust outlet to the outer ends of the outermost heat exchange pipes 38 was an average of approximately 65 inches and the apparatus was found to resonate at a frequency of about 70 cycles per second (operating on the basic frequency) which confirms the fact that the entire apparatus was in resonance.

From the viewpoint of minimizing carbon dioxide emissions in the exhaust from the furnace, it is desirable to design the exhaust system so that combustion is substantially complete before the exhaust gases enter the heat exchange pipes 38. The high velocity of the gases entering the exhaust system and the resulting rate of heat transfer to the air in passageway 30 together with the temperature drop which occurs due to expansion, inevitably results in some carbon monoxide in the exhaust gases. By providing an exhaust system in which substantially all of the combustion takes place upstream of the heat exchange pipes 38, the exhaust gases remain sufficiently hot for the carbon monoxide in the gases to re-associate with available oxygen (and form $CO_2$) before rapid cooling takes place in the pipes 38. In practical tests it has been found that the particular design of the primary exhaust pipe 34 and the manifold 36 as shown in the drawings will reduce the combustion gas temperature to about 900° F. (from a temperature of the order of 3000° F. at the exhaust outlet of the combustion chamber), allowing the carbon monoxide to reassociate with the available oxygen. In this connection, it has been found that the ratio of length to internal diameter of the primary exhaust pipe 32 preferably should not be less than of the order of 8:1.

The heat exchange pipes themselves are copper tubes internally coated with lead for corrosion resistance. The ends of the tubes which are to be coupled to the manifold 36 are fitted with conventional inverted flare fittings, one of which is indicated at 110 in FIG. 1. The openings 98 in the manifold (FIG. 4) are internally screw-threaded and the flare fittings are screwed into those openings. At their opposite ends, each pipe 38 passes through a plain opening in the outer wall of chest 26 and is externally screw-threaded. Nuts 112 and 114 are provided on the screw-threaded portion of the pipe and clamped onto opposite sides of the chest wall with the interposition of suitable gaskets.

Figure 3:
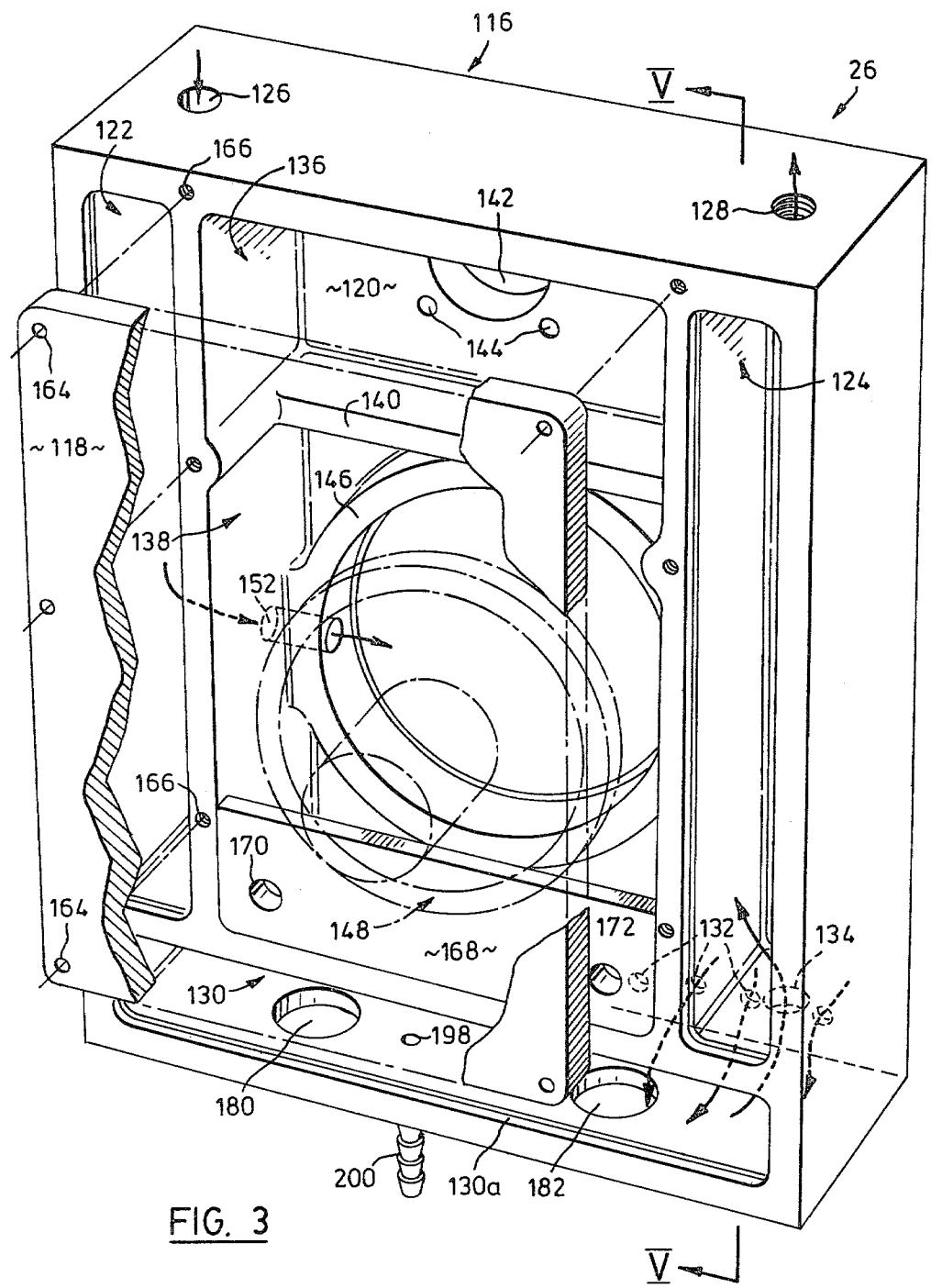
FIG. 3 is a perspective view, partly broken away and partly exploded, of a chest which forms part of the apparatus of FIG. 1.

The chest itself is shown in some detail in FIG. 3; in that view, the chest is seen from the side opposite the outer wall referred to above. The chest is made up of a number of castings in high density concrete. These castings include a main casting 116 which has the general form of a rectangular tray or box having a plurality of internal chambers. The chambers are open at their rear ends (considering the chest in its position of use), and the open ends are closed by cast rectangular panels, the principal one of which is indicated at 118 in FIG. 3. The main casting 116 has a base which defines the outer wall of the casting, and which is denoted 120 in FIG. 3. A number of other walls extend outwardly from the outer wall 120 and define the chambers referred to above.

At the left hand side of casting 116 as seen in FIG. 3 is an inlet muffler chamber 122 which is of narrow rectangular shape and which extends over a substantial portion of the height of the casting. A second, similar chamber 124 is provided at the opposite side of the casting and defines an exhaust muffler chamber. The top wall of the casting includes an inlet opening 126 which communicates with chamber 124. Extending across the bottom of casting below chambers 122 and 124 and of similar shape thereto is an exhaust cushion chamber 130. The heat exchange pipes 38 communicate with chamber 130 by way of openings in the outer wall of the chest as discussed above in connection with FIG. 1. Four of these openings are indicated at 132 in FIG. 3 although it will be understood that a series of such openings will extend right across the outer wall of the chest, one for each heat exchange pipe 38. Chamber 130 communicates with the muffler chamber 124 by way of an opening 134 in the lower wall of chamber 124.

Disposed immediately above chamber 130 is a central cavity in chest 26 which may be considered to define an air cushion chamber 136 and a blower chamber 138 separated by a partial horizontal wall 140—see FIG. 1. (On the other hand, these chambers can be considered as a single chamber since wall 140 is not complete.) In any event, the outer casting wall 120 is formed with an opening 142 in air cushion chamber 136 through which part of the combustion chamber casting 72 extends in the assembled furnace (see FIG. 1). Two of the bolt holes used for securing the combustion chamber to the chest are visible at 144. Combustion chamber 24 is a major source of noise in the furnace, but it has been found that by designing chest 26 is shown with muffler chamber 122 and 124 on opposite sides of the combustion chamber noise transmission to the environment can be minimized. The fact that chest 26 is made of concrete also has a noise reducing effect.

Blower chamber 138 is defined in part by an annular projection 146 from the outer wall 120 of casting 116. Projection 146 is arranged to provide a seating surface for a blower indicated in ghost outline at 148 in FIG. 3 and shown in full lines in FIG. 1. As can best be seen from FIG. 1, a further chamber 150 is defined between the outer wall 120 of casting 116 and the blower 148. Chamber 150 communicates with the inlet chamber 122 by way of an opening 152 in the wall between the two chambers. Thus, air entering air chamber 122 through inlet 126 can flow into chamber 150 by way of opening 152. Blower 148 will then deliver the air from the chamber 150 into chamber 138 and the air will flow from that chamber into the air cushion chamber 136 and will be drawn into the combustion chamber 24 as required.

Blower 148 includes a generally disc-shaped housing 154 for an impeller (not shown), and a electric motor 156 which is coupled to the impeller for rotating the same about the longitudinal axis 158 of the blower. Housing 154 includes a central inlet opening 160 which communicates with chamber 150 and by which air is drawn into the housing and a peripherally arranged series of slots 162 through which air is discharged into chamber 138 as the impeller rotates. The blower is held in place on projection 146 (with the interposition of a suitable rubber gasket—not shown) by a compression spring 163 which extends between the blower housing 154 and the chest closure panel 118.

Blower 148 is used only during starting of the pulse combustion apparatus. When satisfactory combustion has been initiated, the power supply to the blower motor 148 is switched off (as will be described) and the blower impeller will come to rest. The impeller is designed to allow communication between the blower inlet 160 and the outlets 162 even when the impeller is stationary so that air can continue to be drawn through the blower and into the air cushion chamber 136 as required by the pulse combustion apparatus.

Referring back to FIG. 3, the closure panel 118 referred to above is normally secured to casting 116 by bolts which pass through openings in panel 118 such as those indicated at 164 and which are received in screw-threaded openings in the casting such as those indicated at 166. Thus, panel 118 can be removed if necessary for servicing. The panel closes air cushion chamber 136 and chamber 138 except for a lower portion of the chamber which is permanently closed by a somewhat smaller concrete panel 168 permanently secured in place by epoxy adhesive. This panel is formed with openings 170 and 172 through power and gas supply lines are routed into chest 26. Opening 170 receives a power supply line for blower 148 while opening 172 receives a gas supply line for the pulse combustion apparatus. Part of the gas supply line is indicated at 174 in FIG. 1 and a conduit sleeve for the power supply line is shown at 176 positioned in opening 170. The power line itself is not shown. Suitable gaskets will of course be provided around the gas supply line and the power line to prevent air leakage from chest 26.

Chambers 122, 124 and 130 are permanently closed by panels similar to panel 168, which are permanently secured to casting 116 by epoxy adhesive. These panels are shaped to fit into recesses formed around the outer ends of the respective chambers such, for example, as the recess indicated at 130a in the case of chamber 130. However, these panels have not been shown. The bottom wall of the exhaust cushion chamber 130 (which is also the bottom wall of casing 116) includes two openings 180 and 182 which are normally closed by blow-out plugs such as that indicated at 184 in FIG. 1. These plugs are provided as a safety measure to prevent damage to the casing 116 in the unlikely event of an unexpected explosion in the exhaust cushion chamber 120, for example due to faulty or delayed ignition. The plugs normally close the openings 180 and 182 but are designed to blow out in response to an abnormal increase in pressure in the chamber 130 and thereby protect the casing from breakage.

Referring to plug 184 (FIG. 1) as representative of both plugs, the plug includes a central spindle 186 which extends through opening 180. Three equally spaced arms 188 extend outwardly from the top of the spindle and have notches adjacent their outer ends which fit over the edge of opening 180 so that spindle 186 is in effect suspended from the arms. Slidably mounted on spindle 186 below opening 180 is a closure disc 190 dimensioned to fit over and close opening 180. A gasket 192 is provided above disc 190. The disc and gasket are applied against the lower face of casting 116 by a compression spring 194 which extends between the disc and a washer supported by a nut 196 on a lower, screw-threaded end portion of spindle 186. The spindle 186 is formed with a shoulder (not shown) so that nut 196 can be tightened against the shoulder and will compress spring 194 to a predetermined extent, thereby biassing disc 190 into its closed position under a predetermined biassing force. This force will be selected to allow the closure disc to move down in response to a predetermined abnormal pressure in chamber 130. Gasket 192 is made of closed cell neoprene rubber for minimizing noise transmission during normal furnace operation.

In this particular embodiment, two blow-out plugs have been provided and the holes 180 and 182 are of 2" diameter and are spaced 9" apart. While this arrangement has been found suitable for a particular practical embodiment of the invention, it will of course be understood that the number, size and arrangement of the plugs may vary.

Referring back to FIG. 3, a condensate drain opening 198 is provided between the blow out plugs and is fitted with a barb-type sleeve or drain outlet 200. Thus, when the furnace is in operation, water condenses from the combustion gases in the heat exchange tubes 38 and is sprayed into the exhaust cushion chamber 130. In condensing, the water gives up its latent heat of vapourization to the air flowing through passageway 30 which has some additional heating effect on the air. At the same time, the condensate which is sprayed into the exhaust cavity serves to muffle much of the noise which would normally occur in this area. The relatively large volume of chamber 130 further serves to at least partially absorb the pulsations in the incoming exhaust gas for a further reduction in noise.

Referring now more particularly to FIG. 5, the exhaust gases entering chamber 130 flow upwardly through opening 134 and into the muffler chamber 124. Two spaced layers of bonded glass fiber matting indicated at 202 and 204 are disposed inside chamber 124 with the space therebetween aligned with opening 134 (and with exhaust outlet opening 128); thus, the exhaust gases pass upwardly through the space between the two layers in travelling to outlet 128. It has been found that the glass fibre layers have a significant noise absorbing effect, further reducing the exhaust noise of the apparatus. The glass fibre layers are simply friction fitted into chamber 124. A single layer of bonded glass fibre is also provided in inlet chamber 122 for the purpose of reducing inlet noise. This layer is disposed at the outer side of the chamber (remote from wall 120) so as to avoid obstructing the opening 152 (FIG. 3).

Referring back to FIG. 5, the exhaust outlet opening 128 is externally screw-threaded and is fitted with a check valve 206 having an internal valve element 208 which normally closes the exhaust outlet when the furnace is not in use but which will be lifted by the exhaust gases to open the outlets when the furnace is operating. Check valve 206 serves to reduce the convection effect which would otherwise tend to cause moist air to flow back through the apparatus and condense in chest 26 when the furnace is off. The provision of a check valve in the exhaust is particularly important for avoiding problems due to "icing" of the chest in cold climates, especially where two or more furnaces are coupled to a common exhaust stack.

Reference will now be made to FIGS. 6 and 7 in more particularly describing the means (denoted 84 in FIG. 1) for admitting successive fuel charges to the combustion chamber. FIG. 6 shows the combustion chamber inlet casting 72 in section. The casting includes the inlet passageway 76 referred to above. The outer end portion of passageway 76 is of inwardly tapering conical form and receives a valve plate 210 which includes a conical portion 210a shaped to fit closely inside the conical portion of the passageway, and an outwardly projecting flange 210b which overlies the outer end face of casting 72. Immediately upstream of the inner end of casing 72 (the end adjacent casting 70), passageway 76 defines a cylindrical chamber 76a which receives a flame trap 212. Flame trap 212 is in the form of a spiral of corrugated stainless steel strip; the corrugations define openings between the turns of the spiral through which fuel charges can flow while the strip itself prevents blow-back of burning gases through the combustion chamber inlet.

Associated with valve plate 210 is a gas cushion chamber 214 which is also visible in FIG. 1. As can best be seen in that view, the gas cushion chamber comprises an open topped cylindrical body or "can" 216 fitted with a cap 218. The gas supply line 174 is coupled to the can and delivers gas into the cushion chamber in use. A pin 220 having a head at its outer end extends through the can and holds the can and cap in place. As can best been seen from FIG. 6, pin 220 is screw-threaded at its inner end and is received in a complimentarily screw-threaded bore in a support 222 secured to valve plate 210. The support defines openings 223 between the valve plate and the gas cushion chamber through which air can flow into the combustion chamber from the air cushion chamber 136. At the same time, gas can flow from the gas cushion chamber 214 into the combustion chamber through four gas supply tubes, two of which are visible at 224 in FIG. 6. These tubes are open ended and extend outwardly from the gas cushion chamber generally parallel to one another and into valve plate 210.

Admission of air and gas to the combustion chamber is controlled by four pressure responsive valves associated one with each of the tubes 224. Two of these valves are indicated at 226 in FIG. 6 and are more specifically illustrated in FIG. 7. Referring now to that view, the conical portion 210a of valve plate 210 terminates at a bottom wall 210c in which the valves 226 are disposed. One of the valves is shown exploded at $226_1$ and another of the valves is shown in its fully assembled position at $226_2$; the other two valves have been omitted. The gas supply tubes associated with the two valves which are shown are visible in part in FIG. 7.

Referring particularly to valve $226_1$, it will be seen that the valve includes inner and outer perforated discs 230 and 232 respectively which are essentially identical and are provided with respective sets of openings 234 and 236. It will be noted that the openings include a relatively large circular central opening surrounded by an annular series of relatively small openings, which is itself surrounded by a series of intermediates sized openings. While this particular configuration of openings has been found to be eminently satisfactory in practice, it is not considered to be essential. Also, it should be noted that the chamber of valves can be changed.

The inner disc 230 of each valve member is force-fitted into the associated opening 228 in valve plate 210. It will be seen that the opening is in fact formed with an annular rebate 236 which receives the disc so that the disc cannot move downwardly out of the opening. The associated gas inlet tube 224 is brazed or expanded into the central opening in disc 230 and is provided with an annular rebate 238 at its outer end for this purpose. The outer disc 232 is supported parallel to and at a spacing from the inner disc 230 by support lugs indicated at 240. The lugs are formed integrally with the bottom wall 210c of the valve plate 210 and are arranged so that the outer disc of each valve can be supported by three lugs although some of the lugs are used for more than one valve. Each lug is shaped to define a step 240a positioned to appropriately space the outer disc from the inner disc. When the discs are in place, the lugs are peened over at their outer ends, for example as indicated at 240b in FIG. 7 to retain the outer valve disc.

Disposed between the two perforate discs 230 and 232 of each valve is an imperforate disc 242 which acts as a valve member for controlling the flow of air and gas through the openings in the inner disc 230. Valve member 242 is light and freely movable and the two discs 230 and 232 are spaced by an amount sufficient to allow disc 242 to move between extreme positions in which it closes the openings in the respective discs 230 and 232. Of course, the support lugs 240 for the outer discs 232 also serve to retain the discs 242 while allowing them freedom of movement between their extreme positions.

It will be readily appreciated that the valves 226 will operate automatically in response to pressure changes in the combustion chamber. During a vacuum transient in the chamber, the negative pressure in the chamber will act on the valve members or discs 242 through the openings 236 in the outer discs 232 to cause the valve member 242 to move outwardly and allow gas and air to enter the combustion chamber through the openings 234 in disc 230. Conversely, pressurized gas in the combustion chamber will act on the valve members 242 through the openings 236 in discs 232 and cause the valve members to move inwardly and close the gas and air inlet openings in the inner discs 230.

In this particular embodiment, the discs 242 are made of Dacron (TM) fabric coated with polychloro-trifluoroethylene sold under the trade mark KEL-F by M. W. Kellog Co. The discs 230 and 232 are brass stampings and the valve plate 210 is an aluminum casting and is secured to the combustion chamber 72 by four bolts (not shown). The gas cushion chamber support 222 is also an aluminum casting and is secured to the valve plate by four rivets (not shown).

Figure 9:
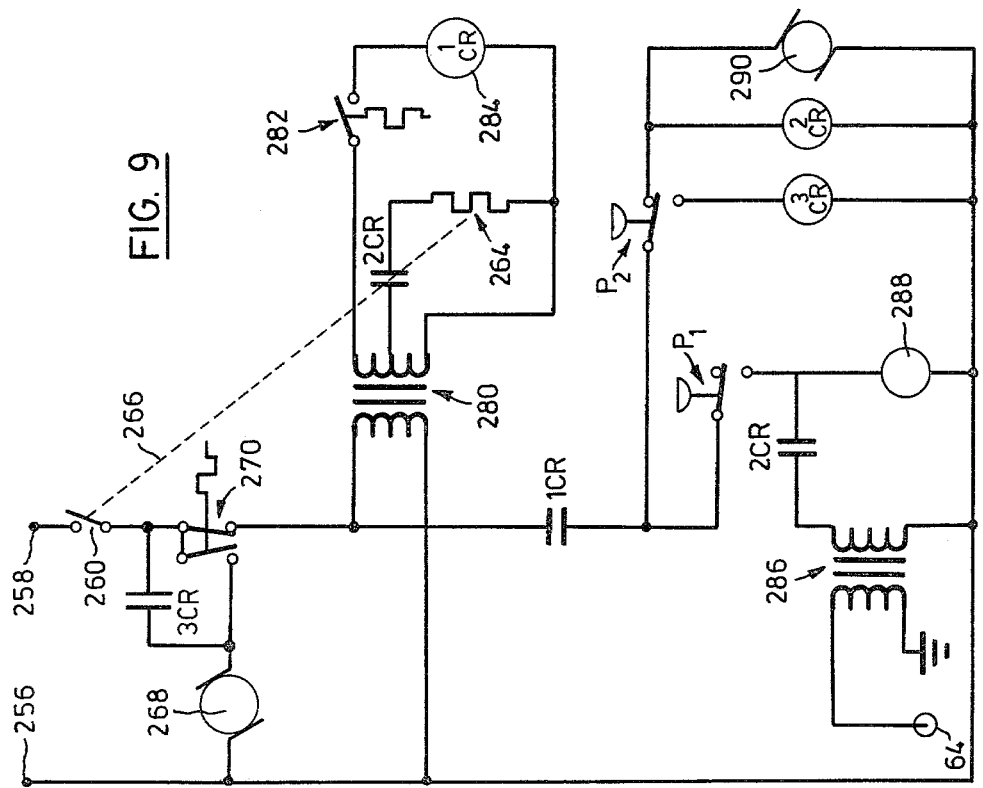
FIG. 9 is a schematic circuit diagram of a control system for the furnace.
Figure 8:
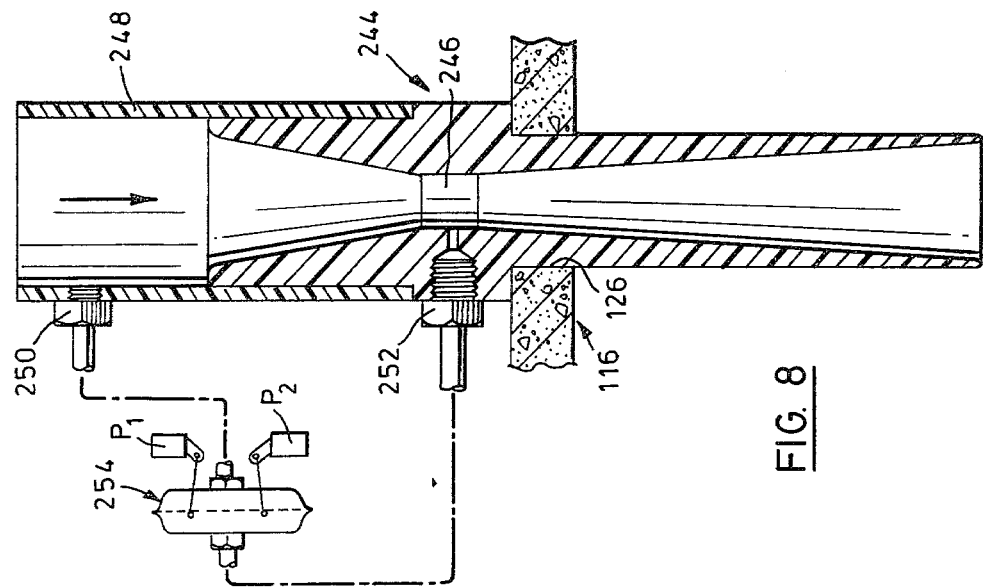
FIG. 8 is a detail view of a further feature of the apparatus.

Reference will now be made to FIGS. 8 and 9 in describing the control system for the pulse combustion apparatus of the furnace. In this connection, it is to be understood that, while the control circuit is being described specifically in connection with an air furnace, its application is not limited in this regard and that the control system may be used with other forms of pulse combustion apparatus including, for example, those described in U.S. Pat. Nos. 3,267,985 and in 4,241,723 and 4,241,720 discussed above.

Referring now particularly to the embodiment described above, the control system is designed to provide for automatic starting of the pulse combustion apparatus in response to a call for heat from a thermostat, and to automatically shut down the pulse combustion apparatus in the event that combustion is not established. At the same time, the system will automatically control the main blower 40 of the furnace (FIG. 1). Basically, the system operates by detecting the reduction in velocity which occurs in the air intake of the apparatus when combustion is established as compared with the intake velocity during starting (when only the starting blower 148 is in operation). Measurement of the intake velocity is achieved by providing a restriction in the air intake and measuring the pressure drop across that restriction. In this particular embodiment, this is achieved by providing a venturi in the air intake and measuring the pressure drop across the venturi. The venturi itself is shown in FIG. 8 and will be positioned in the air inlet opening 126 in the chest 26 of the pulse combustion apparatus; the venturi has not been shown in FIG. 3 but is indicated generally at 244 in FIGS. 1 and 8.

Referring particularly to FIG. 8, the venturi 244 is shown mounted in the inlet opening 126 in casting 116. The direction of air flow is indicated by the arrow in FIG. 8. The venturi 244 includes a throat 246 and is fitted with plain tube 248 at its inlet side. Pressure tappings 250 and 252 are provided in tube 248 upstream of the venturi and in the region of throat 246. The two pressure tappings are coupled by pressure lines to a differential pressure responsive switch assembly 254 which includes two switches P1 and P2 calibrated to respond to different pressure differentials across the venturi. The pressure lines or tappings each include a damping orifice (not shown). In this particular embodiment, switch P1 is set to be operated when the pressure differential between the two tappings 250 and 252 is 1.3" water gauge. Switch P2 is set to operate 4" water gauge pressure. It has been found that, during starting of the apparatus when blower 148 is in operation the pressure differential across the venturi 244 will be approximately 1.4" water gauge and that, when combustion has been established in chamber 24, that differential will increase to approximately 5.5" water gauge. Accordingly, the signals generated by switches P1 and P2 can be taken respectively as indicating that blower 148 is operating satisfactorily and that combustion has been established. These signals are then used in the electrical circuit of the system, which is shown in FIG. 9.

Referring to that view the pressure switches referred to in connection with FIG. 8 are designated P1 and P2. The circuit is connected to a 115 V and 60 Hz power supply at terminals 256 and 258. A main on/off switch is indicated at 260 and is of the type conventionally used for starting electric motors in which the switch incorporates a heater which will automatically open the switch after a predetermined time interval. The heater associated with switch 260 is indicated at 264 and the connection between these two elements is indicated by the dotted line 266. The motor for blower 140 is indicated at 268 and has associated therewith a conventional fan and limit control 270 which is responsive to the air temperature in the furnace and which is designed to keep the fan motor running after the pulse combustion apparatus has switched off and there is still heat in the heat exchangers.

A first transformer 280 provides a 24 volt power supply to a conventional thermostat 282 which, in practice, would be installed in the living space to be heated by the furnace. The thermostat is normally open and closes when heat is called for. Transformer 280 also has a centre tapping which provides the power supply to the heater 264 for the on/off switch. The thermostat circuit also includes a first relay indicated at 1CR which has a pair of normally open contacts 1CR in the main power supply line.

A second transformer 286 provides a 6,000 volt ignition power supply to spark plug 64. Pressure switch P1 is connected in the supply line to transformer 286 and has normally open contacts which interupt the power supply to the transformer when the switch is inoperative. Switch P1 also controls the power supply to a solenoid 288 in the gas supply to the pulse combustion apparatus.

Pressure switch P2 is conncted in one of the power supply lines to the starting blower, the motor of which is indicated at 290. The contacts of P2 are normally closed and the switch also has normally open contacts in the supply to a further relay 3CR having relay contacts 3CR in series with the main blower motor 268. Relay 3CR may be omitted if the fan and limit control has a fast temperature response. Finally, a relay 2CR is connected in parallel with the starting blower motor 290 and has relay contacts 2CR in the supply to the ignition transformer 286. The operation of the circuit shown in FIG. 9 is as follows:

The main power supply switch 260 to the circuit will be normally closed. When thermostat 282 calls for heat, relay 1CR will be energized, closing its contacts 1CR and establishing a power supply to the starting blower motor 290. Blower 148 will then run to purge any residual gases from the combustion chamber. When the pressure differential at the air intake venturi 244 reaches 1.3" water gauge, switch P1 will be operated, energizing the gas solenoid 288 and establishing the gas supply to the gas cushion chamber. Provided switch P2 has not been energized at this time, relay 2CR will be energized so that its contacts will be closed and the ignition transformer 286 will be energized to provide a spark at plug 64.

When combustion is established in chamber 24, the pressure differential across the inlet venturi will increase and switch P2 will be operated when that differential reaches 4" water gauge. The blower motor 290 and heater 264 will then be de-energized as will relay 2CR, de-energizing the ignition transformer. At the same time, relay 3CR will be energized, energizing motor 268 and bringing the main blower 40 into operation. The power supply to the gas solonoid will be maintained through pressure switch P1. When thermostat 282 opens the associated circuit, relay 1CR will drop out, de-energizing the gas solonoid 288 (to cut off the gas supply) and relay 3CR. Relay contacts 3CR will open and the main blower motor 268 will stop after a predetermined temperature decrease has occurred, as determined by switch 270.

In the unlikely event of a malfunction in the apparatus, the circuit will automatically "lock out" preventing further attempts to start until the main on/off switch 260 has been manually reset. For example, if thermostat 282 calls for heat but the starting blower does not operate, switch P1 will not be operated so that the gas solonoid and ignition transformer will remain deenergized. However, heater 264 will be energized and will operate to trip the main on/off switch 260 after a predetermined time. If the starting blower 148 does operate but combustion is not established, switch P2 will not operate and again heater 264 will open switch 260 after a predetermined time. In this event, the main blower motor 268 will not operate because relay 3CR will remain de-energized.

While it has been found in practice that the circuit described above operates perfectly satisfactorily, in some cases, it may be desirable to incorporate means for intermittently interupting the power supply to the gas solonoid during the starting cycle to prevent a build up of gas, and hence an overly "rich" mixture in the combustion chamber. The interupter would be switched out as soon as combustion had been established.

Another possible modification to the circuit of FIG. 9 would be to replace the heater-type switch 260 by some other form of timer designed to open the switch if combustion is not established after a predetermined time.

Many other possible modifications are possible within the broad scope of the invention; it will of course be understood that the preceding description relates to a preferred embodiment only. For example, referring to the circuit of FIG. 9, it would be possible to derive the signals provided by switches P1 and P2 in other ways. The venturi arrangement described is to be preferred in that the pressure loss which occurs in the venturi is substantially recovered downstream. However, a simple restriction in the intake pipe could be used to provide a similar effect. Other means responsive to the velocity changes which occur in the venturi during starting and after establishment of combustion could alternatively be used. In the embodiment of FIG. 8, pressure tapping 250 could of course be open to air.

It will also of course be understood that the particular materials and construction techniques referred to above are to be considered as representative illustrations only and do not limit the scope of the invention. For example, although chest 26 has been described as being a concrete casting, it could be made in other materials such as steel or glass fibre; however, concrete is preferred because of its sound insulating properties.

I claim:

1. A pulse combustion air furnace comprising:
   means defining a passageway through which air to be heated can flow;
   a combustion chamber having a fuel charge inlet and an exhaust gas outlet;
   means supporting the combustion chamber in said air flow passageway;
   means associated with said combustion chamber inlet for admitting successive fuel charges to said chamber;
   means operable to initiate combustion in said chamber;
   an exhaust system disposed in said air passageway and comprising a primary exhaust pipe having first and second ends and coupled at its first end to said exhaust gas outlet of the combustion chamber; a manifold having an inlet to which said second end of the primary exhaust pipe is coupled and a plurality of outlets; and a plurality of heat exchange pipes each having an inlet coupled to one of said manifold outlets and an outlet, said pipes extending from the manifold across said air passageway so that the pipes are disposed in the path of air flowing through said passageway in use; and,
   means defining a muffler chamber to which said second ends of the heat exchange pipes are coupled;
   said primary exhaust pipe, manifold and heat exchange pipes forming a resonant system with said combustion chamber so that the ignition of successive fuel charges in said combustion chamber causes pressure waves to oscillate throughout said exhaust system including the heat exchange pipes for promoting transfer of heat from said pipes to air flowing through said passageway in use.

2. A furnace as claimed in claim 1, wherein said air passageway has an inlet end from which air is intended to flow in a direction towards an outlet end, and wherein each of said heat exchange pipes defines a first run in which the pipe extends from the manifold across the air passageway, and a second run in which the pipe returns across the passageway, said second run being spaced along said passageway from said first run in a direction counter to said air flow direction so that air to be heated will pass over said pipe runs in counter flow to the exhaust gases in the pipes in use.

3. A furnace as claimed in claim 2, wherein the primary exhaust pipe is disposed upstream of said heat exchange pipes and said combustion chamber is disposed upstream of the primary exhaust pipe both with respect to said air flow direction.

4. A furnace as claimed in claim 1, wherein said means supporting the combustion chamber in that air flow passageway comprise a chest having an outer surface disposed at a side of said passageway, the combustion chamber being coupled to said chest at said surface, and wherein the chest defines a plurality of internal chambers including: an air inlet muffler chamber; an air cushion chamber communicating with said combustion chamber inlet; a blower chamber communicating with said inlet chamber and said air cushion chamber; an exhaust cushion chamber to which said second ends of the heat exchange pipes are coupled; and an exhaust muffler chamber which communicates with said exhaust cushion chamber and includes an exhaust outlet; and wherein the furnace further includes a starting blower disposed in said blower chamber and operable to deliver air from said inlet chamber to said air cushion chamber and to allow air to flow from said inlet chamber to said cushion chamber when the blower is inoperative.

5. A furnace as claimed in claim 4, wherein said chest comprises a concrete casting having an outer wall defining said outer surface of the chest, and a plurality of cavities extending away from said outer wall and defining said chambers, said cavities being initially open at their ends remote from said outer surface, and being closed by initially separate closure panels; and wherein said air inlet muffler chamber and said exhaust muffler chamber are disposed on opposite sides of said air cushion chamber.

6. An air furnace as claimed in claim 4, further comprising a check valve coupled to said exhaust outlet and adapted to prevent reverse gas flow into said outlet when the furnace is inoperative.

7. A furnace as claimed in claim 4, wherein said means defining a passageway through which air to be heated can flow comprises a casing secured to said outer surface of the chest and surrounding said combustion chamber, said casing having open upper and lower ends extending generally normal to said chest outer surface and defining outlet and inlet ends respectively of said passageway.

8. An air furnace as claimed in claim 1, wherein said primary exhaust pipe comprises a rectilinear pipe section extending between said combustion chamber outlet and said manifold inlet, and a plurality of heat radiating fins projecting outwardly from said pipe section.

9. A furnace as claimed in claim 8, wherein the ratio of the length of said pipe section to its internal diameter is not less than approximately 8:1.

10. A furnace as claimed in claim 1, wherein said manifold is of elongate form and extends normal to the direction of air flow in said passageway, and normal to but in the same plane as the heat exchange pipes extending therefrom, and wherein said inlet is disposed generally centrally of the length of the manifold, and said outlets are spaced along the manifold on both sides of said inlet, and wherein the manifold includes a plurality of external heat radiating fins for facilitating radiation of heat from the manifold to air in said passageway.

11. A furnace as claimed in claim 9, wherein said manifold outlets communicate with said inlet by way of an internal passageway which tapers outwardly from both sides of said inlet to said outlets.

12. A furnace as claimed in claim 4, wherein said combustion chamber defines an internal cavity having the general shape of a flattened sphere which extends about a median plane and which is circular in said plane, the chamber being disposed with said cavity median plane generally normal to said outer surface of the chest, and wherein the combustion chamber includes a plurality of external heat radiating fins.

* * * * *

UNITED STATES PATENT OFFICE
CERTIFICATE OF CORRECTION

Patent No. 4,309,977    Dated January 12, 1982

Inventor(s) John A. Kitchen

It is certified that error appears in the above-identified patent and that said Letters Patent are hereby corrected as shown below:

Column 11, line 38 change "reduction" to -- increase --.

Column 11, line 47 change "drop across" to -- differential of --.

Column 13, lines 12,15,25 and 39 correct the spelling of "solenoid".

Column 13, line 38 correct the spelling of "interrupting".

Column 13, line 41 correct the spelling of "interrupter".

Signed and Sealed this

Eighth Day of February 1983

[SEAL]

Attest:

GERALD J. MOSSINGHOFF

*Attesting Officer*    *Commissioner of Patents and Trademarks*